United States Patent Office 3,808,254
Patented Apr. 30, 1974

3,808,254
RESOLUTION-RACEMIZATION OF α-AMINO-α-PHENYLACETONITRILE
Gary J. Matthews, Boulder, Colo., assignor to Syntex Corporation, Panama, Panama
No Drawing. Filed June 10, 1971, Ser. No. 151,920
Int. Cl. C07c 121/78
U.S. Cl. 260—465 D                17 Claims

ABSTRACT OF THE DISCLOSURE

Optically inactive racemic α-amino-α-phenylacetonitrile is resolved-racemized by contact of the racemic mixture with an optically active tartaric acid in the presence of an alkanoic acid having two to eight carbon atoms. Under similar conditions, optically active enantiomers of α-amino-α-phenylacetonitrile are racemized-resolved into the opposite enantiomer. The tartrate salts of the optically active enantiomers are hydrolyzed to give the optically active α-amino-α-phenylacetic acid, free or as its hydrogen chloride salt. The resolved acids are known and have known uses, for example, as resolving agents.

---

This invention relates to a second-order asymmetric transformation of α-amino-α-phenylacetonitrile into the respective enantiomers and the hydrolysis thereof to the corresponding enantiometrs of α-amino-α-phenylacetic acid or the hydrogen chloride salt thereof.

The enantiomers of α - amino - α - phenylacetic acid (α-phenylglycine) are known compounds. They are each useful, inter alia, as a substrate for optically active dyes [see Ingersoll et al., J.A.C.S. 44, 2930 (1922)] and for separating optical isomers of other substances. Because of commercial implications, the separation of optical isomers of various substances is important and is therefore receiving recent technological attention—see Ind. and Eng. Chem. 60, (8), 12 (1968). For example, D(—)-phenylglycine is one of the less expensive, industrially produced, optically active substances and it can be applied to the resolution of other racemic substances; Chem. Abstracts 68, 50018 (1968), and Chem. Abstracts 71, 108900 (1969).

The obtention of optically active aminoacid enantiomers can be accomplished in a number of ways, such as by the hydrolysis of natural proteins, which usually gives the common L-aminoacid; by the isolation from microbiological fermentation broths, which selectively produce only one enantiomer; by stereospecific chemical synthesis using an optically active reagent; by resolution of racemic material using natural enzymes; and by chemical resolution using chromatographic substrates or a chemical resolving agent, such as strong acids or an optically active base or acid.

In chemical resolution methods, a racemic compound is combined in a reversible manner with an optically active compound to form a new diastereoisomeric compound. The development of a resolution method of this type is, at best, quite unpredictable.

Although in principle both enantiomers (if there is only one asymmetric center in the material to be resolved) should be obtainable and in optically pure foam, in practice the prediction of useful yields of either enantiomer is impossible. Even if the resolution method proves successful, commonly only one of the isomers is obtained in the optically pure state. A major disadvantage in any event lies in the fact that the maximum yield of the individual enantiomers is only 50%.

Now it has been discovered that α-amino-α-phenylacetic acid (or its hydrogen chloride salt) can be obtained as the respective individual enantiomers by the use of a second-order asymmetric transformation of racemic α-amino-α-phenylacetonitrile or of the opposite enantiomer, followed by hydrolysis thereof. The process of the present invention permits the production and obtention of a particular, individual (optically active) enantiomer of α-amino-α-phenylacetonitrile by the use of readily obtainable resolving agents and in yields approaching 100 percent of the total amount of α-amino-α-phenylacetonitrile present. The process of the present invention further permits the obtention of the corresponding enantiomeric acid as its hydrogen chloride salt.

The present invention, in a first aspect, is directed to a novel process which comprises contacting racemic α-amino-α-phenylacetonitrile with an optically active tartaric acid in the presence of an alkanoic acid having two to eight carbon atoms to give the tartaric acid salt of one enantiomer of α-amino-α-phenylacetonitrile.

The present invention, in a second aspect, is directed to a novel process which comprises contacting an opitcally active α-amino-α-phenylacetonitrile with an optically active tartaric acid in the presence of an alkanoic acid having two to eight carbon atoms to give the tartaric acid salt of the enantiomer of said α-amino-α-phenylacetonitrile.

The present invention, in a third aspect, is directed to a novel process which consists essentially of hydrolyzing a tartaric acid salt of an optically active α-amino-α-phenylacetonitrile with hydrogen chloride to give optically active α-amino-α-phenylacetic acid hydrogen chloride.

The method of the present invention thus permits the reversible combination of the D and/or L enantiomers of α-amino-α-phenylacetonitrile with the particular optically active tartaric acid employed and provides for concomitant resolution and racemization. Thus, as tartaric acid salt of one enantiomer is formed and removed by differential solubility, the other enantiomer racemizes to provide more salt formation. The continuous and concomitant resolution-racemization thus serves to provide a method whereby up to 100 percent of the particular, desired enantiomer salt is obtained.

The isolated, individual enantiomer salts are then hydrolyzed, if desired, to the corresponding α-amino-α-phenylacetic acid enantiomer, or its hydrochloride salt. It has been discovered that the formed α-amino-α-phenylacetonitrile enantiomers are surprisingly hydrolyzable to give the corresponding optically active α-amino-α-phenylacetic acid hydrogen chloride salt in good yields.

The present invention is particularly directed to the resolution-racemization of racemic α-amino-α-phenylacetonitrile with the optically active L-tartaric acid in the presence of alkanoic acid having two to eight carbon atoms to obtain exclusively D-α-amino-α-phenylacetonitrile-L-hemitartrate and, upon hydrolysis, D-α-amino-α-phenylacetic acid hydrogen chloride. Similarly, contacting L-α-amino-α-phenylacetonitrile with L-tartaric acid in the presence of alkanoic acid having two to eight carbon atoms gives exclusively the D-α-amino-α-phenylacetonitrile-L-hemitartrate and, upon hydrolysis, the corresponding D-α-amino-α-phenylacetic acid hydrogen chloride.

In the practice of the present invention, suitable known alkanoic acids containing from 2 to 8 carbon atoms include acetic, propionic, n-butyric, isobutyric, n-pentanoic, isopentanoic, trimethylacetic, n-hexanoic, 3,3-dimethylbutyric, 2 - ethylbutyric, n - heptanoic, 2,2 - dimethylpentanoic, n-octanoic, triethylacetic, 2-ethylhexanoic, or mixtures of the above acids.

Lower alkanoic acid is employed in amounts ranging from about 5 parts to about 20 parts for each part of α-amino-α-phenylacetonitrile; however, lower or higher proportions can be employed depending upon choice of acid substrate diluent if any temperature and so forth.

The method of the present invention is conducted at a temperature of from about 20° C. to about 60° C. preferably from about 24° C. to about 44° C. and for a period of time ranging from about 4 hours to about 72 hours, preferably about 8 hours to about 15 hours. The method of the present invention is preferably conducted under anhydrous or substantially anhydrous conditions. In carrying out the method hereof, the α-amino-α-phenylacetonitrile and optically active tartaric acid can be contacted in any convenient order or fashion, preferably in about stoichiometric amounts. Some form of agitation, e.g., simple stirring, is preferred. The formed differentially soluble salts are readily removed or isolated by simple mechanical means, such as filtration or decantation.

The method of the present invention can be conducted if desired, with the use of a suitable liquid diluent, preferably those miscible with the alkanoic acid. Examples of such suitable media are aryl hydrocarbons, such as benzene, xylene, toluene, mesitylene, and the like; aliphatic hydrocarbons, such as pentane, hexane, octane, and the like; chlorinated hydrocarbons, such as methylene chloride, chloroform, carbon tetrachloride, and the like; hydrocarbon ethers, such as diethylether, diisopropyl ether, dioxane, tetrahydrofuran, and the like; esters, such as ethyl acetate, isopropyl acetate, and the like; ketones, such as acetone, methyl ethyl ketone, and the like; or mixtures of one or more of the above. Particularly preferred diluents are benzene, toluene, xylene, methylene chloride, chloroform, ethyl acetate, isopropyl acetate, diethyl ether, diisopropyl ether, acetone, and methyl ethyl ketone.

If suitable liquid diluent is employed in admixture with alkanoic acid, proportions of acid to diluent in the range of about two parts acid to each part diluent are employed. The proportions of acid to diluent are determinable depending upon the polarity of diluent and strength of acid employed but generally are employed in the proportions set forth above.

The isolated tartrate salt of one of the enantiomers of α-amino-α-phenylacetonitrile can be hydrolyzed to the corresponding α-amino-α-phenylacetic acid enantiomer. The hydrolysis can be effected under acid conditions, preferably by use of a mineral acid, such as hydrogen chloride, hydrogen bromide, sulfuric, p-toluene sulfonic and the like in liquid reaction medium, such as the diluents described above (preferably aqueous solutions thereof), and at temperautres ranging from about 60° C. to about 105° C., preferably, reflux temperature, and for a period of time ranging from about 1 hour to about 4 hours. When performing the hydrolysis by the step consisting essentially of treatment with hydrogen chloride, the corresponding α-amino-α-phenylacetic acid hydrogen chloride enantiomer is surprisingly formed in good yield.
Thrtsea ETA(oi The starting α-amino-α-phenylacetonitrile compounds are known and can be prepared by known methods, for example by the general procedure of treating benzaldehyde with hydrogen cyanide and an aqueous mixture of acetic acid and an alkali metal salt thereof to give mandelonitrile. Treatment of the mandelonitrile with ammonia provides the α-amino-α-phenylacetonitrile. See, for example, U.S. 2,748,154; Chem. Reviews, April 1948; Organic Synthesis, Coll. vol. 3, 84–6 (1955); J.A.C.S. 42, 2264 (1920); and J.A.C.S. 56, 2197 (1934).

The present invention is likewise applicable and useful for the resolution-racemization of other α-amino-α-phenylacetonitriles which contain substituents in the phenyl ring, notably in the para position, such as hydroxy, methoxy, chloro, and methyl. The starting substituted benzaldehydes for preparing these substituted α-amino-α-phenylacetonitriles are known compounds.

For example, contacting racemic α - amino-α-(p-hydroxyphenyl)-acetonitrile with optically active L-tartaric acid in the presence of an alkanoic acid give exclusively D-α-amino-α-(p-hydroxyphenyl) - acetonitrile-L-hemitartrate and, upon hydrolysis, D - α - amino-α-(p-hydroxyphenyl)-acetic acid and D-α-amino-α-(p-hydroxyphenyl)-acetic acid hydrogen chloride. Similarly, the corresponding L-acids are obtained using D-tartaric acid. In like manner, contacting L-α-amino-α-(p-hydroxyphenyl)-acetonitrile with L-tartaric acid, in accordance herewith, gives exclusively the D-α-amino-α-(p - hydroxyphenyl)-acetic acid and its hydrogen chloride salt.

In like manner, the other α - amino - α - (substituted phenyl)-acetonitriles are resolved-racemized to their respective enantiomeric tartrate salts and, upon hydrolysis, the corresponding enantiomer acids and their hydrogen chloride salts.

The present invention can be further illustrated by the following examples.

EXAMPLE 1

A mixture of 9.75 g. (0.065 mole) of L-(+)-tartaric acid and 60 ml. of glacial acetic acid is stirred at room temperature and 8.25 g. (0.0625 mole) of D,L-α-amino-α-phenylacetonitrile is added thereto. The mixture is stirred at about 25° C. overnight, after which time it is filtered. The precipitate is washed with about 50 ml. of benzene and dried at room temperature to give 15.3 g. (0.0542 mole) of D-(+)-α-amino-α-phenylacetonitrile-L-(+)-hemitartrate, $[\alpha]_D$ +45° (c.=1 in water).

EXAMPLE 2

A mixture of 19.5 g. (0.13 mole) of L-(+)-tartaric acid and 210 ml. of glacial acetic acid is stirred at room temperature and a solution of 16.5 g. (0.125 mole) of D,L-α-amino-α-phenylacetonitrile in 94 g. of benzene is added thereto over a period of 15 minutes while maintaining temperatures of from about 26.7° C. to about 30° C. The mixture is stirred at room temperature overnight after which time it is filtered. The precipitate is washed with 250 ml. of benzene and dried at room temperature to give 29.95 g. (0.106 mole) of D-(+)-α-amino-α-phenylacetonitrile-L-(+)-hemitartrate, $[\alpha]_D$ +41°.

EXAMPLE 3

A mixture of 19.2 g. (0.128 mole) of L-(+)-tartaric acid and 110 g. of glacial acetic acid is stirred at room temperature and a solution of 16.5 g. (0.125 mole) of D,L-α-amino-α-phenylacetonitrile in 71 g. of benzene is added thereto over a period of 15 minutes. The mixture is heated to about 40° C. and stirred overnight. The mixture is cooled to room temperature and stirred for two to eight hours, after which time it is filtered. The precipitate is washed with 80 ml. of benzene and dried at room temperature to give 33.5 g. (0.119 mole) of D-(+)-α-amino-α-phenylacetonitrile-L-(+)-hemitartrate, $[\alpha]_D$ +44°.

EXAMPLE 4

A mixture of 9.6 g. (0.064 mole) of L-(+)-tartaric acid in 105 ml. of glacial acetic acid is stirred at room temperature. A solution of 8.25 g. (0.0625 mole) of D,L-α-amino-α-phenylacetonitrile in 47 g. of xylene is added thereto while maintaining the mixture at about 30° C. The mixture is stirred at about 30° C. for one day. After this time the mixture is filtered and the precipitate washed with xylene to give 16.2 g. (0.0575 mole) of D-(+)-α-amino - α - phenylacetonitrile-L-(+)-hemitartrate, $[\alpha]_D$ +45°.

EXAMPLE 5

A mixture of 9.75 g. (0.065 mole) of L-(+)-tartaric acid and 110 g. of glacial acetic acid is stirred at room temperature and a solution of 8.25 g. (0.0625 mole) of D,L-α-amino-α-phenylacetonitrile in 50 g. of diethyl ether is added thereto over a period of about 5 minutes. The mixture is stirred at room temperature for about a day, after which time it is filtered. The precipitate is washed with 60 ml. of diethyl ether and dried at room temperature to give 15.6 g. (0.0552 mole) of D-(+)-α-amino-α-phenylacetonitrile-L-(+)-hemitartrate, $[\alpha]_D$ +44.4°.

EXAMPLE 6

A mixture of 4.8 g. (0.032 mole) of L-(+)-tartaric acid and 50 ml. of glacial acetic acid is stirred at room temperature and a solution of 4.12 g. (0.0312 mole) of D,L-α-amino-α-phenylacetonitrile in 25 g. of isopropyl acetate is added thereto. The mixture is stirred at about 25° C. overnight, after which time it is filtered. The precipitate is washed with isopropyl acetate to give 7.6 g. (0.027 mole) of D-(+)-α-amino-α-phenylacetonitrile L-(+)-hemitartrate, $[α]_D$ +45°.

EXAMPLE 7

A mixture of 4.8 g. (0.032 mole) of L-(+)-tartaric acid and 50 ml. of glacial acetic acid is stirred at room temperature and a solution of 4.12 g. (0.0312 mole) of D,L-α-amino-α-phenylacetonitrile in 25 g. of chloroform is added thereto. The mixture is stirred at about 25° C. overnight, after which time it is filtered. The precipitate is washed with chloroform to give 7.5 g. (0.0266 mole) of D-(+)-α-amino-α-phenylacetonitrile-L-(+)-hemitartrate, $[α]_D$ +44.2°.

EXAMPLE 8

A mixture of 9.6 g. (0.064 mole) of L-(+)-tartaric acid and 125 ml. of propionic acid is stirred at room temperature and 8.25 g. (0.0625 mole) of D,L-α-amino-α-phenylacetonitrile is added thereto. The mixture is stirred at about 28° C. for several days, after which time it is filtered. The precipitate is washed with benzene and dried at room temperature to give 15.7 g. (0.0557 mole) of D-(+)-α-amino-α-phenylacetonitrile-L-(+)-hemitartrate, $[α]_D$ +43.5°.

EXAMPLE 9

A mixture of 9.6 g. (0.064 mole) of L-(+)-tartaric acid and 100 ml. of 2-ethylhexanoic acid is stirred at room temperature and a solution of 8.25 g. (0.0625 mole) of D,L-α-amino-α-phenylacetonitrile in 50 ml. of acetone is added thereto. The mixture is stirred at about 27° C. for several days, after which time it is filtered. The precipitate is washed with benzene and dried at room temperature to give 15.4 g. (0.0546 mole) of D-(+)-α-amino-α-phenylacetonitrile-L-(+)-hemitartrate, $[α]_D$ +44.8°.

EXAMPLE 10

The D-(+)-α-amino-α-phenylacetonitrile-L-(+)-hemitartrate (14.1 g., 0.05 mole) is dispersed in 76 g. of 23.2% aqueous hydrogen chloride and the mixture is heated to the boiling point and maintained under reflux for four hours with stirring. After this time, the mixture is cooled to 8° C. and filtered. The precipitate is washed with 20 ml. of cold (−5° C.) concentrated hydrochloric acid. The washed precipitate is then dissolved in 40 ml. of water and 4.0 g. of 50% sodium hydroxide is added thereto to a pH of about 6. It is then cooled to 8° C. and filtered. The precipitate is washed with cold water, isopropanol, and hexane and then dried at 80° C. to give 6.35 g. (0.042 mole) of D-(−)-α-amino-α-phenylacetic acid, $[α]_D$ −156.3° (c.=1 in 1 N hydrochloric acid).

In a similar manner, the products of Examples 1 to 9 are hydrolyzed to give the D-(−)-α-amino-α-phenylacetic acid product.

EXAMPLE 11

The D-(+)-α-amino-α-phenylacetonitrile-L-(+)-hemitartrate (84.6 g., 0.3 mole) is dispersed in 386 g. of 22.8% aqueous hydrogen chloride and the mixture was heated to the boiling point. The mixture was then maintained at 90–100° C. for two hours. After this time, the mixture is cooled to 4° C. and filtered. The precipitate is washed with 50 g. of cold (−10° C.) concentrated hydrochloric acid, then with 60 ml. of isopropanol, and then dried at 40° C. to give 48.8 g. (0.26 mole) of D-(−)-α-amino-α-phenylacetic acid hydrogen chloride, $[α]_D$ −127° (c.=1 in 1 N hydrochloric acid).

In a similar manner, the products of Examples 1 to 9 are thus hydrolyzed to give the D-(−)-α-amino-α-phenylacetic acid hydrogen chloride product.

EXAMPLE 12

The procedures of Examples 1 to 11 are repeated using D-(−)-tartaric acid to give L-(−)-α-amino-α-phenylacetonitrile-D-(−)-hemitartrate $[α]_D$ −44.5° and, after hydrolysis, L-(+)-α-amino-α-phenylacetic acid, $[α]_D$ +156°, or L-(+)-α-amino-α-phenylacetic acid hydrogen chloride, $[α]_D$ +126°.

EXAMPLE 13

The proceduers of Examples 1 to 9 are repeated using L-(+)-tartaric acid and L-(−)-α-amino-α-phenylacetonitrile to give D-(+)-α-amino-α-phenylacetonitrile-L-(+)-hemitartrate, identical with the products prepared in said examples.

EXAMPLE 14

The procedures of Examples 10 and 11 are repeated using the product of Example 13 to give D-(−)-α-amino-α-phenylacetic acid and D-(−)-α-amino-α-phenylacetic acid hydrogen chloride, respectively, identical with the products of said examples.

EXAMPLE 15

The procedure of Example 12 is repeated using D-(−)-tartaric acid and D-(+)-α-amino-α-phenylaetonitrile to give L-(−)-α-amino-α-phenylacetonitrile-D-(−)-hemitartrate and, after hydrolysis, L-(+)-α-amino-α-phenylacetic acid and L-(+)-α-amino-α-phenylacetic acid hydrogen chloride, identical to the products of said example.

EXAMPLE 16

D-(−)-α-amino-α-phenylacetic acid hydrogen chloride (7.87 g., 0.042 mole), obtained as described in Example 11, is slurried in 40 ml. of water. A 50% sodium hydroxide solution (3.35 g.) is added thereto to a pH of about 6. It is then cooled to 8° C. and filtered. The precipitate is washed with cold water and isopropanol and then dried at 80° C. to give 6.05 g. (0.04 mole) of D-(−)-α-amino-α-phenylacetic acid, identical with the product of Example 10.

What is claimed is:

1. A process which comprises contacting racemic α-amino-α-phenylacetonitrile with an optically active tartaric acid in the presence of an alkanoic acid having two to eight carbon atoms at temperatures in the range of about from 20° to 60° C. for about from four to 72 hours to give the tartaric acid salt of one enantiomer of α-amino-α-phenylacetonitrile.

2. The process according to claim 1 wherein the alkanoic aid is acetic acid.

3. The process according to claim 1 conducted in liquid diluent.

4. The process according to claim 3 wherein the liquid diluent is selected from the group consisting of benzene, toluene, xylene, methylene chloride, chloroform, ethyl acetate, isopropyl acetate, diethylether, diisopropyl ether, aetone, and methyl ethyl ketone.

5. The process according to claim 4 wherein the alkanoic acid is acetic acid.

6. The process according to claim 5 wherein the diluent is benzene.

7. The process according to claim 1 wherein the optically active tartaric acid is L-(+)-tartaric acid to give D-(+)-α-amino-α-phenylacetonitrile-L-(+)-hemitartrate.

8. The process according to claim 7 wherein the alkanoic acid is acetic acid.

9. The process according to claim 8 conducted in a liquid diluent.

10. The process according to claim 9 wherein the liquid diluent is benzene.

11. The process according to claim 1 wherein the optically active tartaric acid is D-(—)-tartaric acid to give L-(—)-α-amino-α-phenylacetonitrile-D-(—)-hemitartrate.

12. A process which comprises contacting an optically active α-amino-α-phenylacetonitrile with an optically active tartaric acid in the presence of an alkanoic acid having two to eight carbon atoms to give the tartaric acid salt of the enantiomer of said α-amino-α-phenylacetonitrile.

13. The process according to claim 12 wherein the alkanoic acid is acetic acid.

14. The process according to claim 13 conducted in liquid diluent.

15. The process according to claim 12 wherein the optically active α-amino-α-phenylacetonitrile is L-(—)-α-amino-α-phenylacetonitrile and the optically active tartaric acid is L-(+)-tartaric acid to give D-(+)-α-amino-α-phenylacetonitrile-L-(+)-hemitartrate.

16. The process according to claim 15 conducted in liquid diluent and wherein the alkanoic acid is acetic acid.

17. The process according to claim 12 wherein the optically active α-amino-α-phenylacetonitrile is D-(+)-α-amino-α-phenylacetonitrile and the optically active tartaric acid is D-(—)-tartaric acid to give L-(—)-α-amino-α-phenylacetonitrile-D-(—)-hemitartrate.

References Cited

UNITED STATES PATENTS 3,366,679   1/1968   Reinhold et al. _____ 260—519

ELBERT L. ROBERTS, Primary Examiner

D. H. TORRENCE, Assistant Examiner

U.S. Cl. X.R.

260—465 E, 518 R, 519